US010165393B2

(12) United States Patent
Jones-McFadden et al.

(10) Patent No.: US 10,165,393 B2
(45) Date of Patent: *Dec. 25, 2018

(54) SYSTEM FOR MONITORING RESOURCE UTILIZATION AND RESOURCE OPTIMIZATION

(71) Applicant: BANK OF AMERICA CORPORATION, Charlotte, NC (US)

(72) Inventors: Alicia C. Jones-McFadden, Fort Mill, SC (US); Joseph Benjamin Castinado, North Glenn, CO (US); Matthew Eugene Clark, Milpitas, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 218 days.

This patent is subject to a terminal disclaimer.

(21) Appl. No.: 15/167,093

(22) Filed: May 27, 2016

(65) Prior Publication Data

US 2017/0346711 A1  Nov. 30, 2017

(51) Int. Cl.

| | |
|---|---|
| *H04W 4/02* | (2018.01) |
| *G06Q 20/32* | (2012.01) |
| *H04W 24/02* | (2009.01) |
| *H04W 24/04* | (2009.01) |
| *H04W 24/08* | (2009.01) |
| *H04L 12/927* | (2013.01) |

(52) U.S. Cl.
CPC .......... *H04W 4/02* (2013.01); *G06Q 20/3224* (2013.01); *H04L 47/803* (2013.01); *H04W 24/02* (2013.01); *H04W 24/04* (2013.01); *H04W 24/08* (2013.01)

(58) Field of Classification Search
CPC ... H04L 29/08072; H04L 29/06; H04L 43/00; H04L 12/2602; H04L 41/22
USPC ........................................................ 709/224
See application file for complete search history.

(56) References Cited

U.S. PATENT DOCUMENTS

| | | | |
|---|---|---|---|
| 6,366,298 | B1 | 4/2002 | Haitsuka et al. |
| 7,865,455 | B2 | 1/2011 | Nickerson et al. |
| 8,402,094 | B2 | 3/2013 | Bosworth et al. |
| 8,960,535 | B2 | 2/2015 | Barnes et al. |
| 9,135,359 | B2 | 9/2015 | Dicker et al. |
| 9,183,258 | B1 | 11/2015 | Taylor et al. |
| 9,202,170 | B2 | 12/2015 | Bolivar et al. |
| 2006/0069697 | A1* | 3/2006 | Shraim ................... H04L 51/12 |
| 2008/0301051 | A1* | 12/2008 | Stahlberg ............... G06Q 20/40 |
| | | | 705/44 |

(Continued)

*Primary Examiner* — Vivek Srivastava
*Assistant Examiner* — Hermon Asres
(74) *Attorney, Agent, or Firm* — Michael A. Springs; Moore & Van Allen PLLC; Jeffrey R. Gray

(57) ABSTRACT

A system for monitoring resource utilization and optimization includes an entity system having a network communication interface and a memory device storing a resource monitoring and utilization application and a resource application. A processing device is operatively coupled to the memory device, wherein the processing device is configured to execute computer-readable program code to: determine based on the utilization of a resource application and/or a physical transaction related to the resource application to initiate the resource monitoring and utilization application; initiate the resource monitoring and utilization application to transmit information about the resource application to a user device.

18 Claims, 7 Drawing Sheets

(56) References Cited

U.S. PATENT DOCUMENTS

| | | | |
|---|---|---|---|
| 2010/0006641 A1* | 1/2010 | Boutcher | G06Q 20/20 235/379 |
| 2011/0208603 A1* | 8/2011 | Benefield | G06Q 20/202 705/21 |
| 2011/0238564 A1* | 9/2011 | Lim | G06Q 20/3223 705/38 |
| 2012/0078813 A1* | 3/2012 | Rose | G06Q 40/00 705/36 R |
| 2014/0046830 A1* | 2/2014 | Orozco | G06Q 20/4016 705/39 |

* cited by examiner

SYSTEM FOR MONITORING RESOURCE UTILIZATION AND RESOURCE OPTIMIZATION

BACKGROUND

Systems for providing on-line and/or mobile transactions are known where a user may engage in a wide variety of different types of transactions with entity systems with which the user has a relationship, such as financial institution systems. The on-line and/or mobile transactions are typically instituted via applications that are accessed from a user device that is in communication with the systems over a network.

BRIEF SUMMARY

Embodiments of the present invention provide an innovative system, method and apparatus for monitoring resource utilization and optimization.

In some embodiments an entity system comprises a network communication interface and a memory device storing a resource monitoring and utilization application and a resource application. A processing device is operatively coupled to the memory device and is configured to execute computer-readable program code to: determine based on the utilization of the resource application to initiate the resource monitoring and utilization application; initiate the resource monitoring and utilization application to transmit information about the resource application to a user device.

The resource application may comprise an online/mobile banking application. The resource utilization monitoring and optimization application may apply logic rules to determine if a predetermined condition is met. The logic rules may be predictive of a need for the resource application. The predetermined condition may be based on individual user data and/or aggregated user data. The information may be transmitted over a communication channel between the entity system and a user device. The information may comprise a tutorial for the resource application. The information may comprise contact information for a financial center based on the location of the user device. The resource utilization monitoring and optimization application may detect and track utilization of a physical transaction.

In some embodiments, a method for monitoring utilization of and optimizing a resource comprises: detecting and tracking at an entity system utilization of a resource application at a user device; determining, based on the utilization of the resource application, to initiate a resource monitoring and utilization application; initiating the resource monitoring and utilization application; transmitting information about the resource application to the user device. The method may apply logic rules to determine if a predetermined condition is met where the predetermined condition is based on individual user data. The resource application may comprise an online/mobile banking application and the entity system may comprise a financial institution system. The method may further comprise establishing a communication channel between the entity system and the user device. The method may further comprise communicating a tutorial about the resource application from the entity system to the user device. The method may further comprise transmitting contact information for a financial center to the user device based on the location of the user device. The method may further comprise detecting and tracking at the entity system utilization of a physical transaction.

In some embodiments an entity system comprises a network communication interface and a memory device storing a resource monitoring and utilization application and a resource application. A processing device is operatively coupled to the memory device and is configured to execute computer-readable program code to: determine based on the utilization of a physical transaction to initiate the resource monitoring and utilization application; and initiate the resource monitoring and utilization application to transmit information about a resource application related to the physical transaction to a user device.

The resource utilization monitoring and optimization application may detect and track utilization of the resource application. An optimization rate may be calculated for the resource application.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In accordance with embodiments of the invention, the terms "financial institution" and "financial entity" include any organization that processes financial transactions including, but not limited to, banks, credit unions, savings and loan associations, investment companies, stock brokerages, asset management firms, insurance companies and the like.

Figure 1:
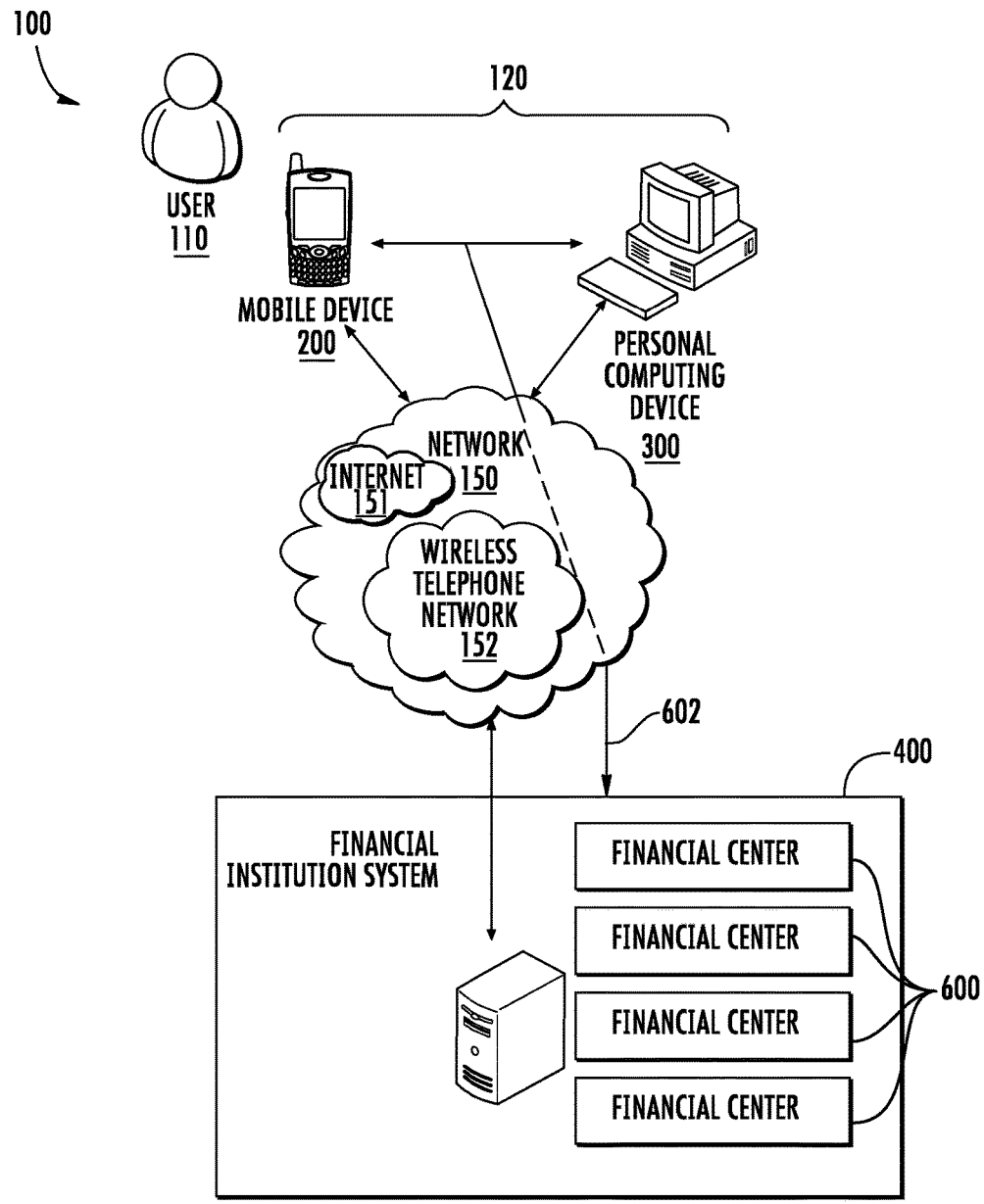
FIG. 1 is a block diagram illustrating a system for monitoring resource utilization and resource optimization, in accordance with embodiments of the invention.

FIG. 1 provides a block diagram illustrating an environment 100 for a system for monitoring resource utilization and optimization, in accordance with an embodiment of the invention. As illustrated in FIG. 1, the environment 100 includes a user 110 where the user represents a customer having a relationship with at least one but typically more than one financial institution. A user of the system may be a person, but may also be a business or any other entity. In a typical environment a great number of users may access the system of the invention.

The environment 100 also may include a plurality of user devices. The user devices may comprise any machine, apparatus, system or the like that may be connected to and communicate over network 150. At least one of the user devices may comprise a computing device 120 for use by the user 110. The computing device 120 may be any device that employs a processor and memory and can perform computing functions, such as a personal computing device 300 or a mobile device 200, that may be connected to or access network 150. The user devices may also include a land-line telephone, fax machine or the like. The personal computing device 300 may comprise a personal computer such as a desk top computer, lap top computer, tablet or any type of personal computing device that may be connected to a network by landline or wireless access such as wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. As used herein, the mobile device 200 may comprise any mobile communication device, such as a cellular telecommunications device (i.e., a cell phone or mobile phone), personal digital assistant (PDA), a mobile Internet accessing device, or other mobile device. A mobile device may connect to the network by a cellular telecommunications network or by WiFi, Bluetooth or other access technology. In some embodiments where, for example, the user is an institution the computing device 120 may comprise servers, access terminals, or the like.

The user computing device 120 may be configured to communicate over network 150 with at least one entity system such as financial institution system 400 of an entity such as a financial institution. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet 151. In one embodiment, the network 150 may also include a wireless telephone network 152.

In general, the user computing device 120 is configured to connect with the network 150 and may be used to log the user 110 into the financial institution system 400 of the financial institution. A user 110 in order to access the user's account(s) typically uses an online banking application and/or mobile banking application on the financial institution system 400 and must authenticate with the financial institution system 400. For example, logging into the financial institution system 400 generally requires that the user 110 authenticate his/her/its identity using a user name, a passcode, a cookie, a biometric identifier, a private key, a token, and/or another authentication mechanism that is provided by or for the user 110 to the financial institution system 400 via the computing device 120. In some embodiments the authentication system may be a tiered system that may require different levels of authentication based on conditions such as, for example, previous activity of the user over the network 150. For example, the tiered authentication system may have three levels of authentication—hard, medium and soft. Hard authentication may require that the user input a high level of authentication information such as a combination of password, user identification, answer to challenge questions, biometrics, random key number or the like. A hard authentication may be required when the user logs on from an unrecognized user device or where the user activity is not recognized by the system. A medium authentication level may require only a user identification and password. A medium level of authentication may be required where, for example, the user has already logged-in to the computing device 120 using an authentication procedure for the device such as a thumbprint or password. A soft authentication may require only a user identification such as user name. A soft level of authentication may be used, for example, where the user has already logged-in to the computing device 120 using an authentication procedure for the device such as a thumbprint or password and the user has performed activities on the user device that are recognized as "normal" activity for that user and/or the user device is in a recognized location for that user. Thus, the level of authentication required for accessing the banking application, whether online, mobile or in person, may be adjusted based on conditions, activity, functions or information received about or from the user.

In one embodiment, the invention may provide an application download server such that software applications that support the financial institution system 400 can be downloaded to the computing devices 120. In some embodiments of the invention, the application download server is configured to be controlled and managed by one or more third-party data providers (not shown in FIG. 1) over the network 150. In other embodiments, the application download server is configured to be controlled and managed over the network 150 by the same entity or entities that maintains the financial institution system 400

Figure 2:
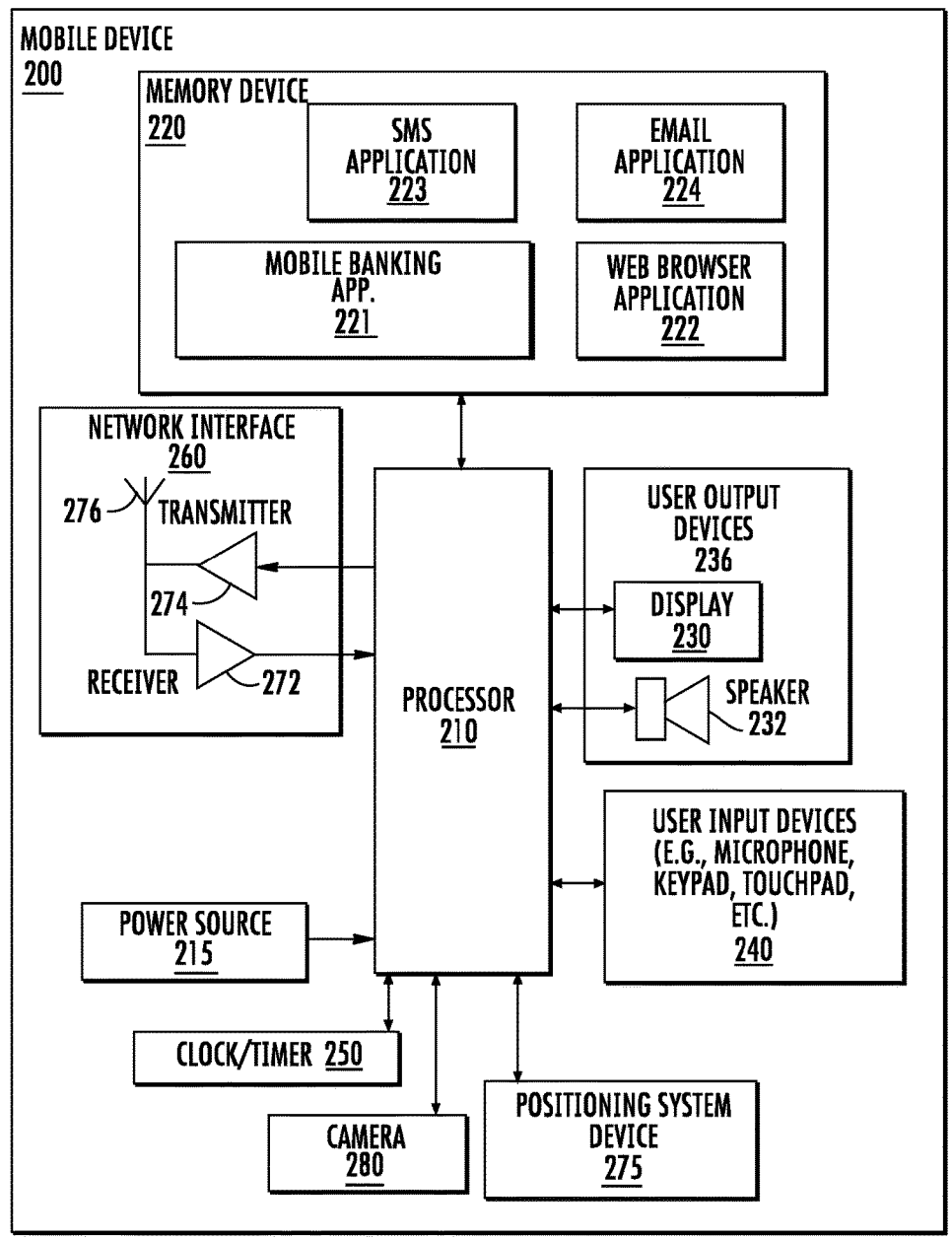
FIG. 2 is a block diagram illustrating the mobile computing device of FIG. 1, in accordance with embodiments of the invention.

FIG. 2 provides a block diagram illustrating a user's mobile device 200 of FIG. 1 in more detail, in accordance with embodiments of the invention. In one embodiment of the invention, the mobile device 200 is a mobile telephone. However, it should be understood that a mobile telephone and the embodiment of the mobile device 200 shown in FIG. 2 are merely illustrative of one type of mobile device 200 that may benefit from, employ, or otherwise be involved with embodiments of the present invention and, therefore, should not be taken to limit the scope of embodiments of the present invention. Other types of mobile devices 200 may include portable digital assistants (PDAs), pagers, tablets, mobile televisions, gaming devices, laptop computers, cameras, video recorders, audio/video player, radio, GPS devices, or any combination of the aforementioned.

Some embodiments of the mobile device 200 include a processor 210 communicably coupled to such devices as a memory device 220, user output devices 236, user input devices 240, and a network interface 260. The mobile device 200 further includes a power source 215, such as a battery, for powering various circuits and other devices that are used to operate the mobile device 200. Embodiments of the mobile device 200 may also include a clock or other timer 250 configured to determine and, in some cases, communicate actual or relative time to the processor 210 or one or more other devices. The mobile device 200 may also include a camera 280 and a positioning system device 275 such as a global positioning system (GPS). The processor 210, and other processing devices described herein, generally include circuitry for implementing communication and/or logic functions of the associated device. For example, the processor 210 may include a digital signal processor device, a microprocessor device, and various analog to digital converters, digital to analog converters, and/or other support circuits. Control and signal processing functions of the mobile device 200 are allocated between these devices according to their respective capabilities. The processor 210 thus may also include the functionality to encode and interleave messages and data prior to modulation and transmission. The processor 210 can additionally include an internal data modem. Further, the processor 210 may include functionality to operate one or more software programs, which may be stored in the memory device 220. For example, the processor 210 may be capable of operating a connectivity program, such as a web browser application 222. The web browser application 222 may then allow the mobile device 200 to transmit and receive web content, such as, for example, location-based content and/or other web page content, according to a Wireless Application Protocol (WAP), Hypertext Transfer Protocol (HTTP), and/or the like. The memory device 220 may include other applications such as e-mail app 224 and SMS app 223.

The processor 210 is configured to use the network interface 260 to communicate with one or more other devices on the network 150. In this regard, the network interface 260 includes an antenna 276 operatively coupled to a transmitter 274 and a receiver 272 (together a "transceiver"). The processor 210 is configured to provide signals to and receive signals from the transmitter 274 and receiver 272, respectively. The signals may include signaling information in accordance with the air interface standard of the applicable cellular system of the wireless telephone network 152. In this regard, the mobile device 200 may be configured to operate with one or more air interface standards, communication protocols, modulation types, and access types. By way of illustration, the mobile device 200 may be configured to operate in accordance with any of a number of first, second, third, and/or fourth-generation communication protocols and/or the like. For example, the mobile device 200 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Consolidated Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 3GPP protocols and/or the like. The mobile device 200 may also be configured to operate in accordance with non-cellular communication mechanisms, such as via a wireless local area network (WLAN) or other communication/data networks.

As described above, the mobile device 200 has a user interface that may be made up of user output devices 236 and/or user input devices 240. The user output devices 236 include a display 230 (e.g., a liquid crystal display or the like) and a speaker 232 or other audio device, which are operatively coupled to the processor 210. The user input devices 240, which allow the mobile device 200 to transmit data, may include any of a number of devices allowing the mobile device 200 to transmit data, such as a keypad, keyboard, touch-screen, touchpad, microphone, mouse, joystick, other pointer device, button, soft key, and/or other input device(s).

The memory device 220 is operatively coupled to the processor 210. The memory device 220 can store any of a number of applications which comprise computer-executable instructions/code executed by the processor 210 to implement the functions of the mobile device 200 and/or one or more of the process/method steps described herein. The memory device 220 also includes a mobile banking application 221 that may be used to allow communication with a system such as the financial institution system 400 to implement the system of the invention. The use of the mobile banking application 221 may facilitate access to the system of the invention by providing log-in systems including user authentication systems, account information, system controls or the like. The mobile banking application 221 also allows communication to the financial institution to allow the user to set up and/or control the system of the invention.

These applications also typically provide a graphical user interface (GUI) on the display 230 that allows the user 110 to communicate with the mobile device 200, the financial institution system 400 and/or other devices or systems. The memory device 220 can also store any of a number of pieces of information, and data, used by the mobile device 200 and the applications and devices that make up the mobile device 200 or are in communication with the mobile device 200 to implement the functions of the mobile device 200 and/or the other systems described herein. For example, the memory device 220 may include such data as user authentication information.

Figure 3:
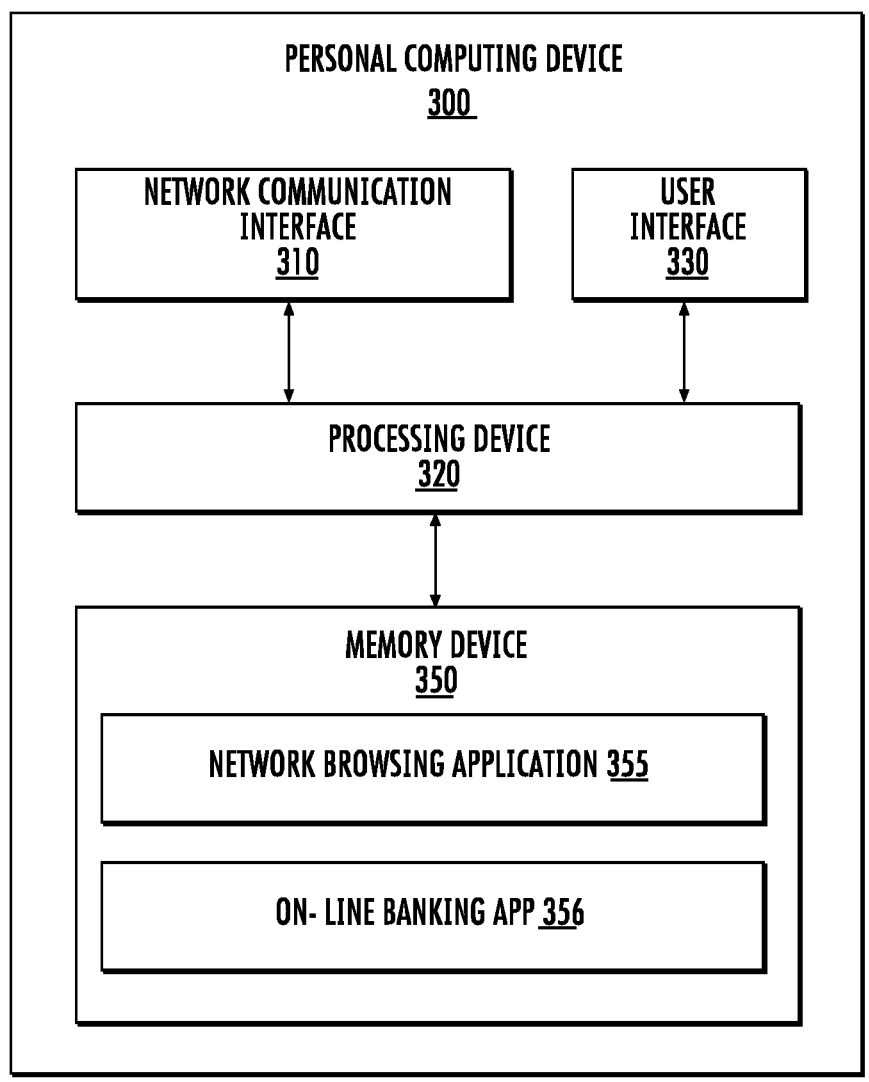
FIG. 3 is a block diagram illustrating the personal computing device of FIG. 1, in accordance with embodiments of the invention.

Referring now to FIG. 3, the personal computing device 300 also includes various features, such as a network communication interface 310, a processing device 320, a user interface 330, and a memory device 350. The network communication interface 310 includes a device that allows the personal computing device 300 to communicate over the network 150. In one embodiment of the invention, a network browsing application 355 provides for a user to establish network communication with a financial institution system 400. The memory device 350 may include such applications as the conventional web browser application 355 and/or an on-line banking application 356. The on-line banking application 356 may be used to allow communication with the entity system such as financial institution system 400 to provide access to the financial institution system providing log-in systems including user authentication systems, account information or the like as previously described with respect to FIG. 2. The on-line banking application 356 also allows communication to the financial institution system 400 to allow the user to set up and/or control the system of the invention.

As used herein, a "processor" or "processing device," such as the processing device 320, processor device 420 and processor 210, generally refers to a device or combination of devices having circuitry used for implementing the communication and/or logic functions of a particular system. For example, a processing device or processor may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device or processor may further include functionality to operate one or more software programs based on computer-executable program code thereof, which may be stored in memory device. As the phrase is used herein, a processor or processing device may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "user interface" generally includes a plurality of user input and output devices and/or software that allow a customer to input commands and data to direct the processing device to execute instructions and to receive communications from the computing devices 120. For example, the user interface 330 presented in FIG. 3 may include a graphical user interface (GUI) or an interface to input computer-executable instructions that direct the processing device 320 to carry out specific functions and an output to communicate with the user 110. The user interface 330 employs certain user input and user output devices as previously described with reference to FIGS. 1 and 2. These input and output devices may include a display, mouse, keyboard, button, touchpad, touch screen, microphone, speaker, LED, light, joystick, switch, buzzer, bell, and/or other user input/output device for communicating with one or more users.

As used herein, a "memory" or "memory device" generally refers to a device or combination of devices that store one or more forms of computer-readable media for storing data and/or computer-executable program code/instructions. Computer-readable media is defined in greater detail below. For example, in one embodiment, the memory devices described herein include any computer memory that provides an actual or virtual space to temporarily or permanently store data and/or commands provided to the processing device when the processing device carries out its functions described herein. As used herein, "memory" or "memory device" includes any computer readable medium (as defined herein below) configured to store data, code, or other information. The memory may include volatile memory, such as volatile Random Access Memory (RAM) including a cache area for the temporary storage of data. The memory may also include non-volatile memory, which can be embedded and/or may be removable. The non-volatile memory can additionally or alternatively include an electrically erasable programmable read-only memory (EE-PROM), flash memory or the like.

Figure 4:
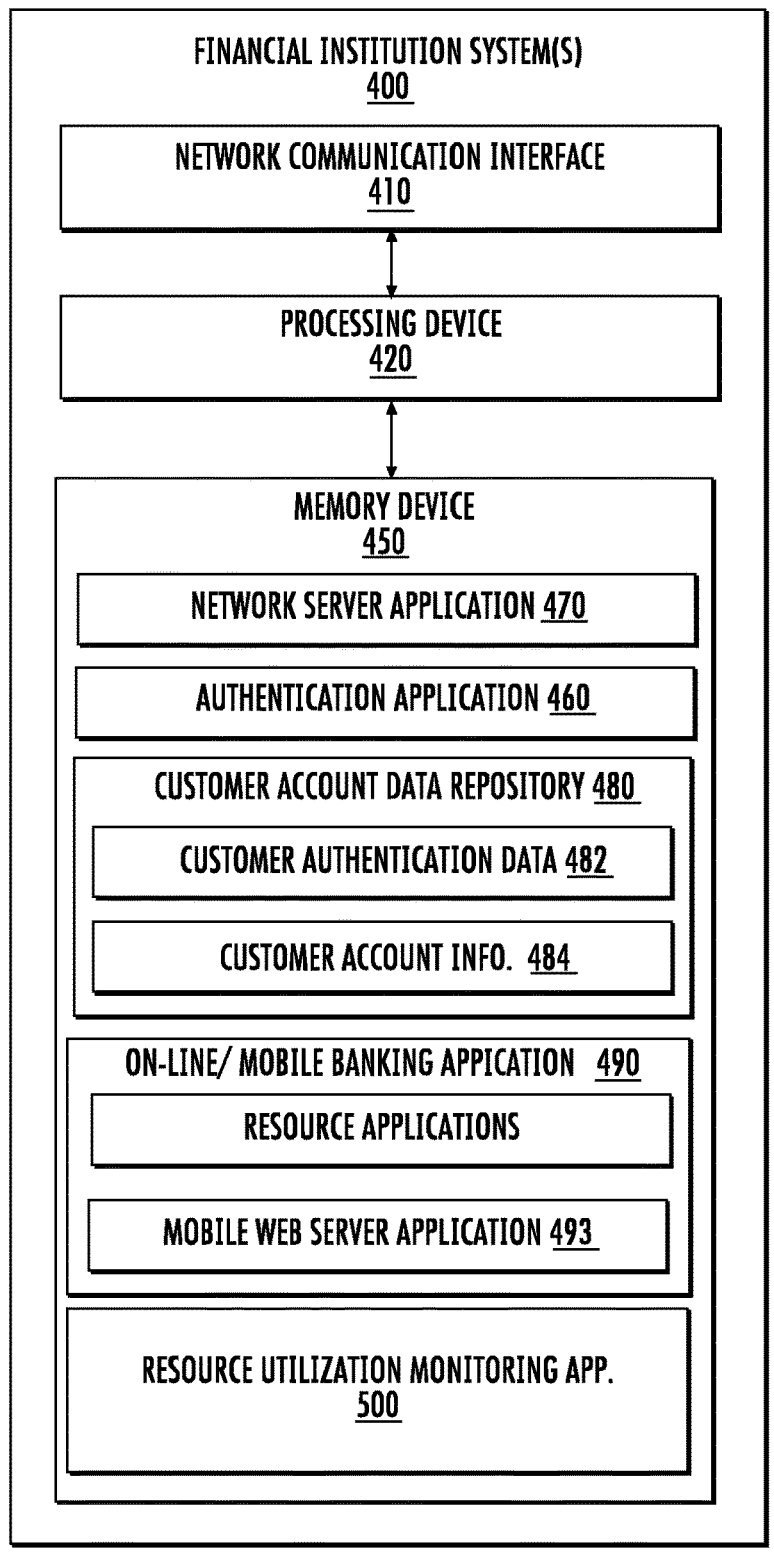
FIG. 4 is a block diagram illustrating the financial institution system of FIG. 1, in accordance with embodiments of the invention.

FIG. 4 provides a block diagram illustrating the entity system such as financial institution system 400, in greater detail, in accordance with embodiments of the invention. As illustrated in FIG. 4, in one embodiment of the invention, the financial institution system 400 includes one or more processing devices 420 operatively coupled to one or more network communication interfaces 410 and one or more memory devices 450. In certain embodiments, the financial institution system 400 is operated by an entity, such as a financial institution.

It should be understood that the memory device 450 may include one or more databases or other data structures/repositories. The memory device 450 also includes computer-executable program code that instructs the processing device 420 to operate the network communication interface 410 to perform certain communication functions of the financial institution system 400 described herein. For example, in one embodiment of the financial institution system 400, the memory device 450 includes, but is not limited to, a network server application 470, an authentication application 460, a customer account data repository 480 which includes customer authentication data 480 and customer account information 484, an on-line/mobile banking application 490 comprising a mobile web server application 493, and other computer-executable instructions or other data. The computer-executable program code of the network server application 470, the authentication application 460, or the on-line/mobile banking application 490 may instruct the processing device 420 to perform certain logic, data-processing, and data-storing functions of the financial institution system(s) 400 described herein, as well as communication functions of the financial institution system(s) 400. The mobile banking application 490 communicates with the user computing devices 120 to facilitate communication between the user and the financial institution.

In one embodiment, the customer account data repository 480 includes customer authentication data 482 and customer account information 484. The network server application 470, the authentication application 460, and the mobile banking application 490 are configured to invoke or use the customer account information 484, the customer authentication data 482 when authenticating a user to the financial institution system(s) 400.

The financial institution system 400 further includes a resource utilization monitoring and optimization application 500 that initiates a communication with the user's computing devices 120. The resource utilization monitoring and optimization application 500 functions to monitor a user's utilization of resources such as the user's utilization of the financial institution's on-line and/or mobile banking applications that are available to the user at the user device 120. The entity system applications such as the financial institution's on-line and/or mobile banking applications available for use by the user computing devices 120 are referred to as "resource applications". The resource utilization monitoring and optimization application 500 also tracks and monitors transactions, financial activity and transaction history of the user that is not conducted via a resource application such as physical checks, in-person transactions such as cash withdrawls, debit/credit card usage and the like. Transactions and financial activity with the financial institution that are not conducted via the resource applications are referred to as "physical transactions."

As used herein, a "communication interface" generally includes a modem, server, transceiver, and/or other device for communicating with other devices on a network. The network communication interface 410 is a communication interface having one or more communication devices configured to communicate with one or more other devices on the network 150, such as the mobile device 200, and/or the personal computing device 300. The processing device 420 is configured to use the network communication interface 410 to transmit and/or receive data and/or commands to and/or from the other devices connected to the network 150.

The environment also comprises at least one financial center 600, FIG. 1, that is related to and may form part of the financial institution that operates and controls the financial institution system 400. The financial center(s) 600 may be a branch office, an ATM machine or other type of facility that may provide in-person customer service and support for the financial institution. The financial centers 600 may also include centralized facilities that are accessible by the distributed financial centers. Typically, the financial institution system 400 comprises a plurality of financial centers that are geographically dispersed to provide services to the financial institution's customers over a wide, and potentially international, geographic area. The financial centers 600 may include at least portions of the financial institution systems 400 that allow each financial center 600 to communicate with other elements of the financial institution system 400 and the user devices 120 over network 150. Each financial center 600 may have access to all or a portion of the financial institution system(s) 400 such that each financial center 600 can communicate with and access at least portions of the processing device 420 and memory device 450 of the financial institution system and in some embodiments the various local systems of the financial centers 600 may be considered to be part of a distributed financial institution system 400. Thus, while the financial centers 600 may be geographically distributed, the financial centers 600 may be considered to form part of the financial institution system(s) 400 as previously described. Each financial center 600 typically includes local processing devices 420 and memory devices 450 and network interface devices 410 that allow the local system of the financial centers 600 to communicate over the network 150 with one another and with centralized systems of the financial institution. The financial centers 600 may also comprise a local customer account data repository, a local online/mobile banking application, a local resource utilization and monitoring application to facilitate communication, data management and security among the financial centers.

In a typical relationship the user is a customer of the financial institution that operates financial institution system 400 and engages the financial institution for a variety of services and products. The user may have relationships with more than one financial institution and the relationship between each user and a financial institution may be different where different products and services are provided by the financial institution and/or utilized by the user. In a typical relationship the user may use some of the financial services and products on a regular basis and may not use certain of the products and services or use some products and services infrequently. In most relationships the user may be able to utilize resource applications such as on-line/mobile banking applications 490 of the financial institution and that can be accessed through user computing device 120 to obtain services and products offered by the financial system 400 and to complete financial transactions with and/or through the financial institution. The user may use some but not all of the resource applications and/or features of the applications offered by the on-line/mobile banking applications 490. Moreover, at least some of the services and products that are available through the on-line/mobile banking applications 490 are also available as physical transactions.

An exemplary suite of on-line/mobile banking resource applications 490 may include some or all of, but is not limited to, the following exemplary applications: money transfers, mobile/electronic check deposit, person-to-person payments (P2P), account statements (checking, savings, term deposits, loans card, equity/fund, insurance and the like), bill payment, cloud storage, cordless ATM withdrawl, pre-approved financing, portfolio management, stock quotes, personalized alerts, location based services, loyalty related agreements, and the like. A large and growing number of mobile and/or on-line banking applications are offered to the user where the user may use the different applications to obtain a variety of different services, perform a variety of different functions and effectuate a variety of different transactions. A user's access to and use of the on-line/mobile banking applications 490 may change over time where some applications or features of the applications are utilized by the user on a regular basis while other applications or features of the applications are used less frequently or not at all.

Figure 5:
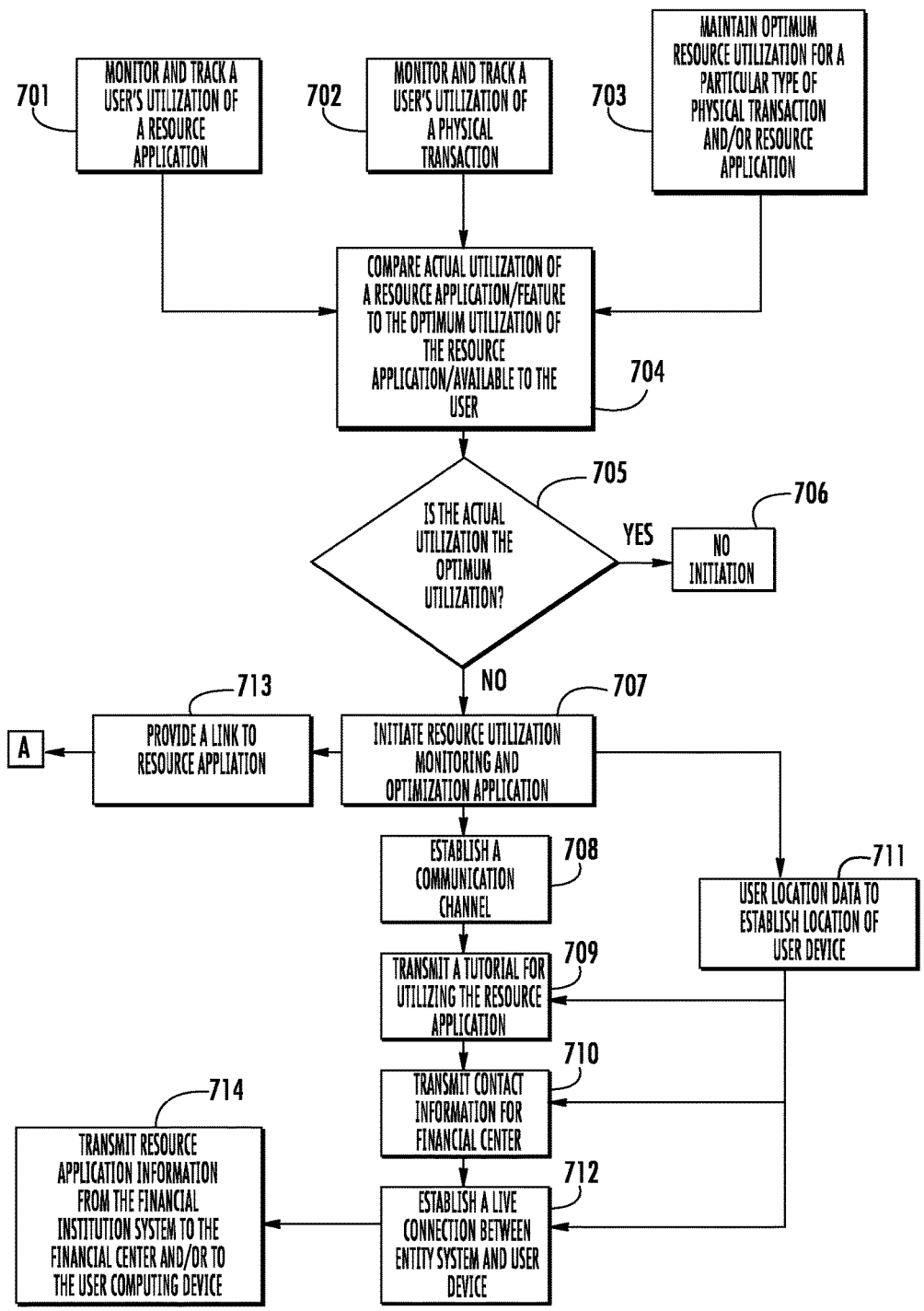
FIG. 5 is a flowchart illustrating methods for monitoring resource utilization and resource optimization, in accordance with embodiments of the invention.

An embodiment of the resource utilization monitoring and optimization application will be described with reference to FIG. 5. In the illustrated embodiment of the system of the invention a user's utilization of the resource applications 490 is monitored and tracked by the resource utilization monitoring and optimization application 500 using, at least, data contained in the customer account data repository 480 (Block 701). The user's utilization of the physical transactions is also monitored and tracked by the resource utilization monitoring and optimization application 500 using, at least, data contained in the customer account data repository 480 (Block 702). These data bases maintains records of services and products offered by the financial institution that are utilized by the user as part of the user's relationship with the financial institution and record the user's transactions, transaction history and financial record and activities. The resource utilization monitoring and optimization application 500 also maintains the optimum resource utilization for a particular type of physical transaction and/or resource application (block 703). In one embodiment, the resource utilization and monitoring application 500 compares the user's actual utilization of the resource applications such as online/mobile banking applications 490 of the financial institution system 400, and features of those applications, to the optimum utilization of the resource applications available to the user (Block 704). The resource utilization and monitoring application 500 may also compare the user's actual utilization of the resource applications such as online/mobile banking applications 490 of the financial institution system 400, and features of those applications, to the user's physical transactions (Block 704). The resource utilization monitoring and optimization application 500 determines if the resource applications and features available to the user are actually being utilized by the user in an optimum manner to obtain the related products and/or services of the financial institution (Block 705).

The resource utilization monitoring and optimization application 500 may apply logic rules to determine if use of a resource application 490 may be optimized based on the user's financial data and transaction history. Logic rules may be set up by the financial institution and retained in memory device 450 of the financial institution system 400. As previously described, in some embodiments the resource utilization monitoring and optimization application 500 detects and tracks a user's utilization of the online/mobile banking resource applications 490. In some embodiments the resource utilization monitoring and optimization application 500 may track utilization of all online/mobile applications 490 available to the user. In other embodiments the resource utilization monitoring and optimization application 500 may only track the utilization of a subset of the online/mobile applications 490 available to the user. The resource utilization monitoring and optimization application 500 may compare the actual utilization of an application or application feature to the potential utilization of the application or application feature to determine an optimization ratio or rate of use where, for example, if the user uses the resource application every time the resource application could potentially be used the optimization ratio would be 100%. In other embodiments, the system logic may track and identify if a resource application 490 or application feature is not being utilized by a particular user. If utilization falls below a predetermined limit the full functionality of the resource utilization monitoring and optimization application 500 invoked. In other embodiments the resource utilization monitoring and optimization application 500 may track physical transactions of the user to determine of online/mobile resource applications 490 are available to the user that may be used in place of the physical transactions. The resource utilization monitoring and optimization application 500 may track both the utilization of a resource application or application feature and physical transactions. The rules may be set up to initiate the resource utilization monitoring and optimization application 500 upon any set of predetermined conditions. The system determines if the user's utilization of a resource application meets the predetermined conditions as set out in the logic rules for optimized utilization (Block 705). If the conditions are met the system takes no further action (Block 706). If the conditions are not met, the full functionality of the resource utilization monitoring and optimization application 500 is initiated (Block 707).

As previously described, in some embodiments the system of the invention establishes rules for when the full functionality of the system of the invention will be initiated for a particular user or for a class of users. In some embodiments the user may have input in establishing the rules; however, in some embodiments the rules may be established by the financial institution based on data accumulated by the financial institution. For example, the financial institution may track a user's utilization of a particular service and product provided by the financial institution. In other embodiments, the financial institution may monitor all services and products utilized by a user. In one embodiment the full functionality of the resource utilization monitoring and optimization application 500 is initiated based on the personal utilization of a resource application by a particular user. The system may track the optimization ratio at which a particular user utilizes, or does not utilize, a resource application or a feature of a resource application and may activate the full functionality of the resource utilization monitoring and optimization application 500 based on the user's personal usage. In some embodiments the system may track the optimization ratio with which an aggregate set of users utilizes a resource application or a feature of a resource application and may activate the full functionality of the resource utilization monitoring and optimization application 500 based on the aggregated user data. For example, the set of users may be based on activities or transactions of the users such as new customers of the financial institution, or new home owners with financing through the financial institution or the set may be based on personal characteristics of the set of users such as eligibility for social security. The system may track the rate at which aggregated user data utilizes, or does not utilize, a resource application or a feature of a resource application and may activate the full functionality of the resource utilization monitoring and optimization application 500 based on the aggregated user utilization data. In some embodiments the aggregated user data and the individual user data may be used together to determine when the system of the invention is initiated. Other rules and combinations of rules may be established in addition to those described herein.

In some embodiments, the logic rules may be based on predictive models rather than on actual utilization data of a resource application. For example, the system may predict the need for certain financial services or products based on known data about a user when compared to aggregated data from the financial institution system users. For example, the system may predict that a user may require a particular financial service or product when the balance in an account exceeds or falls below a certain level based on the requirements of other users in similar circumstances. In other examples the system may be able to predict that the user may require a loan based on the age of the user or the user's dependents. In still other examples the system may predict that the user may optimize the financial institution's online bill paying application when the user purchases a home. In still other embodiments the predictive logic may be based on past transactions of the user. For example, if the system logic determines that the user transfers the same dollar amount from a first account to a second account on the first day of every month, the system may initiate the pertinent funds transfer mobile/on-line application automatically on the first of the month. In addition to initiating the mobile/on-line application automatically, the system may populate the funds transfer application with the pertinent data such as account numbers, dollar amount, date of transfer and the like. When the system is initiated the user may then be simply prompted to push a button select "go" or transfer to authorize the transfer. For the predictive systems the system may develop a confidence rating for the transaction where the confidence rating increases every time a user authorizes the predicted transaction. The confidence rating may be used to track the accuracy of the predictive logic. The confidence rating may also be used to simplify the user's access to the system. For example, when the confidence rating meets or exceeds a threshold rating, the system may be launched on the user device without the user accessing the financial institution on-line/mobile banking application. The system may present a message or other communication on the user device that may be authorized to complete the underlying transaction simply by pressing a "go" button, swiping left or right on a mobile device or the like. Numerous other examples may be provided of the use of a predictive model for initiating the system of the invention and the examples provided above are not intended to be limiting.

If the system of the invention determines, based on the logic rules of the system that the full functionality of the resource utilization monitoring and optimization application 500 is to be activated, the resource utilization monitoring and optimization application is initiated to communicate with a user device (Block 707). Upon initiation of the resource utilization monitoring and optimization application 500, at least one communication channel 602 between a user device 120 and the financial institution system 400 may be established (Block 708). In some embodiments the communication channel is established when a user accesses the financial institution's on-line/mobile application on a user device 120. The full functionality of the resource utilization monitoring and optimization application 500 may be invoked and the communication channel 602 opened when the user accesses the financial institution system's on-line/mobile application on a user computing device 120. The communication channel 602 may be the same connection over which the on-line/mobile banking resource application 490 is being transmitted between the financial institution system 400 and the user computing device 120 or it may be a separate connection. In one embodiment the communication channel 602 delivers on-line content to the user computing device 120 and may be over the same data connection that handles the online/mobile banking application 490. The content may be in the form of text, images, video or a combination of different forms of content. The content may provide tutorials for utilizing the resource application or features of the resource application, help menus, FAQs, additional information as to how the resource application functions, benefits of the resource application or the like. In some embodiments the communication channel 602 may be a different connection than the connection over which the online/mobile banking application 490 is being executed. For example the communication channel 602 may be a live connection to a financial center 600 of the financial institution. In such an embodiment the communication channel may be a voice connection or it may be a video and voice connection while in some embodiments it may comprise a live text-only connection. The user computing device 120 may access the communication channel to obtain additional information regarding the resource application or the feature of the resource application.

In one embodiment the communication channel for the resource utilization monitoring and optimization application 500 is opened when the user accesses the financial institution's on-line/mobile banking application as part of the on-line/mobile banking application 490. In other embodiments the resource utilization monitoring and optimization application 500 may transmit a text message, e-mail message or other electronic message to the user computing device. The message may include information regarding the underoptimized resource application and/or a channel that may be activated by the user to obtain further content as described above. Upon selecting of the channel by the user the resource utilization monitoring and optimization application 500 may be initiated on that user device.

In still other embodiments utilization monitoring and optimization application 500 may initiate a voice call from the financial institution to a user device requesting that the user go to the on-line/mobile banking application to initiate resource utilization monitoring and optimization application 500. The voice call may be a recorded message or it may be a live call or a combination of a recorded message with an option to speak with a live person.

When the logic rules dictate that the full functionality of resource utilization monitoring and optimization application 500 is activated, the resource utilization monitoring and optimization application is initiated and provides instructions and feedback to the user to facilitate the use of the online/mobile banking application 490 and/or application. The resource utilization monitoring and optimization application 500 may run in a separate window on the user computing device 120 or it may be integrated into the online/mobile banking application. The resource utilization monitoring and optimization application 500 provides the user with detailed assistance for utilizing the underoptimized resource application or feature. For example, the resource utilization monitoring and optimization application may provide a tutorial and/or detailed step-by-step instructions for utilizing the application (Block 709). These instructions may be significantly more detailed than the prompts and instructions normally provided with the online/mobile application such that the resource utilization monitoring and optimization application provides enhanced guidance.

In addition to providing detailed instructions the resource utilization monitoring and optimization application may also provide contact information to the user (Block 710). The resource utilization monitoring and optimization application 500 may provide the telephone number or other contact information for a local financial center 600, directions to the nearest, or user selected, financial center(s) and/or the telephone number or other contact information for a help desk. The contact information may be provided in the form of an active channel that may be selected on the user's computing device to connect the user to the local office or help desk. To select the designated financial center 600 for a particular user the resource utilization monitoring and optimization application 500 may use the location information provided by the positioning system device 275 on user's mobile device 200 (Block 711). For a personal computing device 300 the contact information may be for the financial center closest to the user's home or work place. In other embodiments the user may manually select a desired financial center.

In some embodiments the user may be automatically connected to the appropriate financial center 600 such that a live connection may be established to the user's computing device 120 (Block 712). The live connection may allow a live real-time conversation with personnel of the financial center 600 to guide the user through the online/mobile banking application 490. In one embodiment the connection is made to a person physically located at the user's home financial center 600 or at the financial center 600 that is physically closest to the user's current location using the positioning system device 275 on user's mobile device 200. In other embodiments user may be connected to a person at another location based on the service or product of the online/mobile banking application 490. For example, the connection may be made to personnel that have expertise in a particular transaction, product or service without regard to the user's physical location. Once the connection is established the user may interact with the financial center personnel to obtain live real-time assistance with the resource application and/or feature. The personnel may be available to answer questions, provide guidance or otherwise assist in the utilization of the resource application and/or feature. In some embodiments a photograph of the person at the financial center may be sent to the user and/or a photograph of the user may be sent to the person at the financial center. The photographs and other identification information such as name, telephone number, e-mail address or the like of either the financial institution personnel or the user may be used to establish a personal relationship between the user and the person at the financial center.

In addition to providing detailed instructions the resource utilization monitoring and optimization application may also be used to set up further interactions between the financial institution and the user. In one embodiment the resource utilization monitoring and optimization application 500 provides a channel that may be selected to immediately connect the user to the resource application (Block 713). In other embodiments resource application information relating to the resource application may be transmitted from the financial institution system 400 to the designated financial center 600 and/or to the user computing device 120 (Block 714). For example, the resource utilization monitoring and optimization application 500 may schedule an appointment for the user at a designated financial center 600 to meet with personnel of the financial institution. The resource utilization monitoring and optimization application 500 may transmit user information regarding the user such as account information, transaction history or the like to the financial center to facilitate the customer service. In some embodiments the information transmitted to the user and/or financial center personnel may comprise the photograph of the user and/or financial institution personnel such that when the user visits a financial center the user and financial center personnel may recognize one another and further establish a personal relationship.

Figure 6:
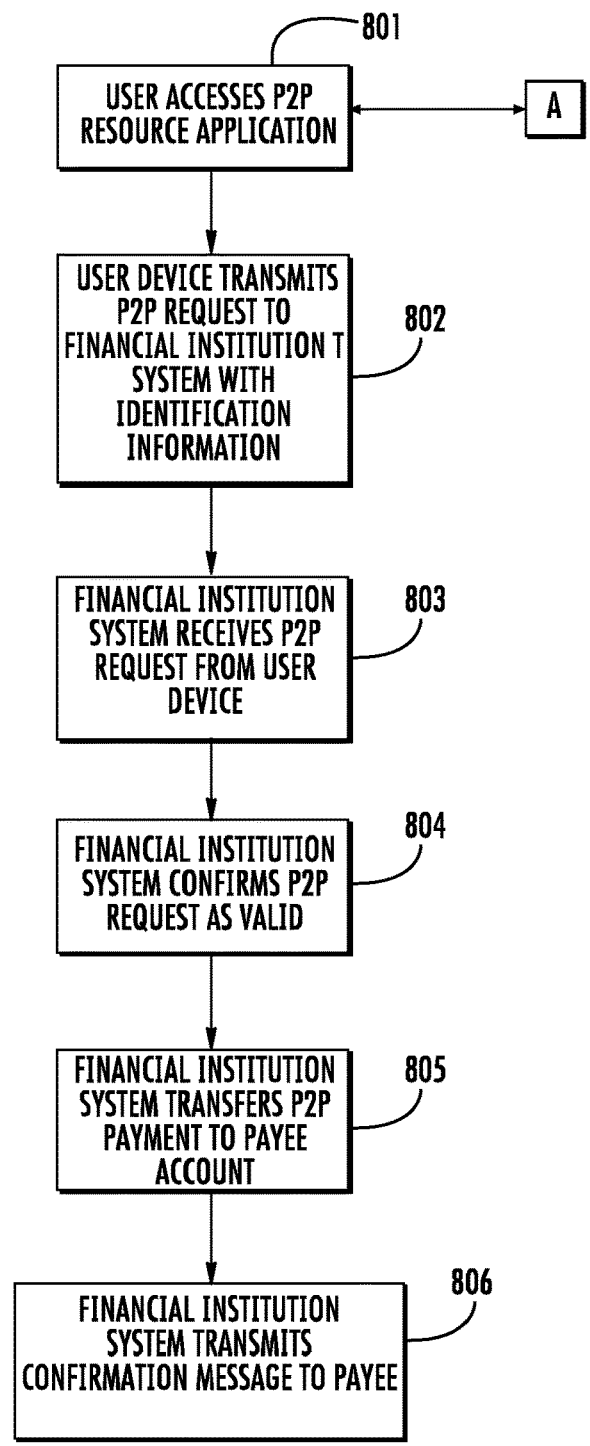
FIG. 6 is a flowchart useful for illustrating a method for monitoring resource utilization and resource optimization, in accordance with embodiments of the invention.

An embodiment of an online/mobile transaction will be described with reference to FIGS. 5 and 6. The embodiment shown in FIG. 6 relates to a person-to-person (P2P) payment transaction. In a person-to-person payment transaction the user is a customer of a financial institution that wants to make a payment to another entity using an on-line or mobile banking application. In some embodiments the entity receiving the payment may be required to be a customer of the financial institution or a customer of a financial institution that is approved by or on the P2P payment network of the user's financial institution; however, in some embodiments the entity receiving the payment may be unrelated to the financial institution of the customer.

To describe the operation of the system of the invention the user is considered to be the person initiating a payment to another person, the payor. In such an application the recipient of the payment, the payee, may also be the user and the system of the invention may be initiated for the payee in addition to the payor. The P2P payment may be initiated from the user device 120 accessing the on-line or mobile banking site of the user's financial institution and utilizing a P2P resource application (Block 801). In either event the user enters identification information such as name, mobile phone number or e-mail address, account number and the dollar amount of the transfer and transmits the request to the user financial institution (Block 802). The financial institution system 400 receives the P2P request (Block 803). The financial institution system 400 confirms the validity of the P2P request (Block 804). After confirming the validity of the request, the financial institution initiates the transfer of payment to the designated financial institution/account of the payee (Block 805). After the payment is completed, the financial system 400 transmits an e-mail or text message to the payee that alerts them of the payment and may provide instructions on how to confirm that the payment is posted to the correct account (Block 806). The first time the user and recipient use the service or as part of the P2P mobile application or on-line banking application, they may register their respective e-mail and/or phone numbers so it's associated with their respective designated accounts.

In one embodiment the resource utilization monitoring and optimization application 500 monitors the user's checking account and determines that the user makes regular payments to other individuals using physical paper checks e.g. the user's physical transactions (Block 702). The resource utilization monitoring and optimization application 500 also monitors the user's utilization of the applicable resource applications (Block 701). The resource utilization monitoring and optimization application 500 determines if use of an online or mobile P2P payment resource application may optimize service for that user (Block 703-705). Other rules may also govern activation of the resource utilization monitoring and optimization application as described above. If the conditions are met the system initiates the full functionality of the resource utilization monitoring and optimization application 500 (Block 707). If the conditions are not met, the resource utilization monitoring and optimization application 500 is not activated (Block 706).

The timing of the initiation of the resource utilization monitoring and optimization application 500 may vary. In one embodiment the initiation of the full functionality of the resource utilization monitoring and optimization application 500 may be based on user activity. For example, the resource utilization monitoring and optimization application 500 may initiate the next time the user opens the user's on-line/mobile banking application. In other embodiments the resource utilization monitoring and optimization application 500 may initiate upon the occurrence of the next similar physical transaction. In other embodiments, the user may be sent an electronic message immediately upon initiation of the full functionality of the resource utilization monitoring and optimization application 500.

When the resource utilization monitoring and optimization application is launched the communication channel may be established to one or more user devices (Block 708). The communication channel may be over the same connection as the on-line/mobile banking application or it may comprise a separate connection such as a separate e-mail, text or other electronic communication or a voice connection. In one embodiment the communication channel delivers content to the user in the form of a tutorial explaining how the P2P application works and providing step-by-step instructions for making a payment using the P2P application (Block 709). The user receives the content on the user device and can access the user's on-line/mobile P2P application to execute the user's next P2P transaction. The application may provide information to facilitate the user's utilization of the application such as providing a channel to the application in the user's on-line/mobile banking application (Block 713).

The user may also be connected to a live person over a communication channel that provides voice and/or video communication with the user device. The live connection may provide additional tutorial for the user. In one embodiment the communication channel may connect the user device to the nearest financial center (Block 710). In this embodiment the resource utilization monitoring and optimization application may receive location information from the user device and may use the location information to connect the user device to the nearest financial center (Block 711).

Figure 7:
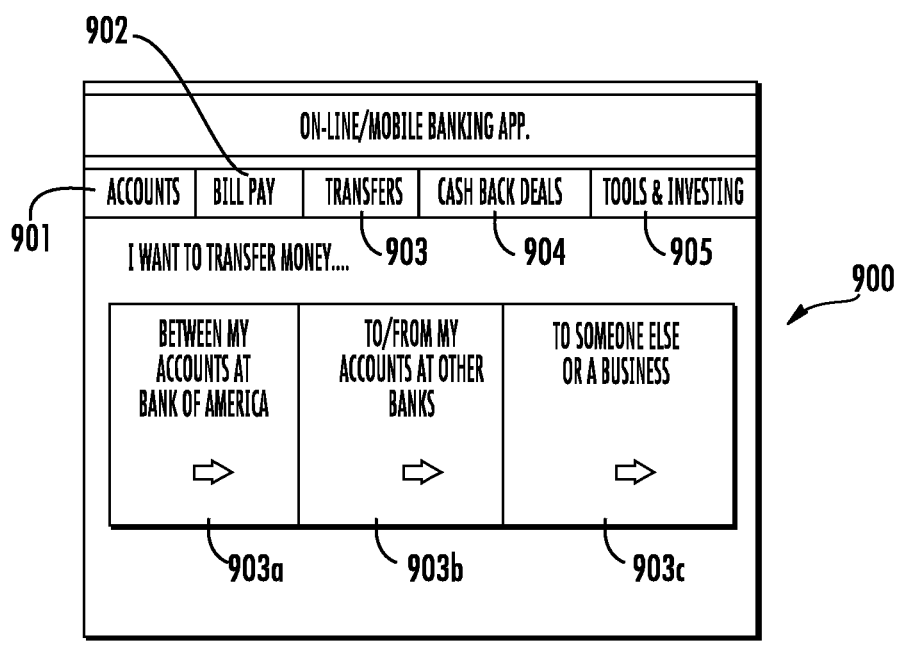
FIG. 7 is a screenshot useful for illustrating a method for monitoring resource utilization and resource optimization, in accordance with embodiments of the invention.

Another embodiment of the invention will be described with respect to the P2P resource application described above where the user may be utilizing the P2P resource application but is not optimizing a feature of the resource application. FIG. 7 is a screen shot 900 of a resource application on a user computing device 120 illustrating various features of the resource application such as accounts 901 that provides account information, bill pay 902, transfers 903 that includes the P2P application 903*c*, cash back deals 904, and tools and investing 905. In this embodiment the user may utilize the on-line/mobile P2P resource application 903*c* to make P2P payments. However, the user may not be fully optimizing all of the features of the resource application. In one embodiment the resource utilization monitoring and optimization application 500 monitors the user's utilization of the P2P resource application 903*c* and determines that the user is not making use of a feature such as the "cash back deals" feature 904. In one embodiment of a cash back feature a user may receive cash back for each P2P transaction made using the financial institution's P2P on-line/mobile banking application. The resource utilization monitoring and optimization application 500 determines that the use of the online/mobile P2P payment application may be optimized for the user by enabling a "cash back" feature on the P2P application or by selecting a different "cash back" option on the P2P application (Block 701, 703-705). Other rules may also govern activation of the resource utilization monitoring and optimization application as described above. If the conditions are met, the system initiates the full functionality of the resource utilization monitoring and optimization application 500 (Block 707). If the conditions are not met, the resource utilization monitoring and optimization application 500 is not activated (Block 706).

As previously explained the timing of the resource utilization monitoring and optimization application 500 may vary. In one embodiment the initiation of the full functionality of the resource utilization monitoring and optimization application 500 may be based on user activity. For example, the resource utilization monitoring and optimization application 500 may initiate the next time the user opens the user's on-line/mobile banking application. In other embodiments the resource utilization monitoring and optimization application 500 may initiate upon opening the P2P resource application 903c. In other embodiments, the user may be sent an electronic message immediately upon initiation of the full functionality of the resource utilization monitoring and optimization application 500.

When the full functionality of the resource utilization monitoring and optimization application is launched the communication channel may be established to one or more user devices (Block 708). The communication channel may be over the same connection as the on-line/mobile banking application or it may comprise a separate connection such as a separate e-mail, text or other electronic communication or a voice connection. In one embodiment the communication channel delivers content to the user in the form of a tutorial explaining how the cash back feature works and providing step-by-step instructions for using the cash back feature (Block 709). The user receives the content on the user device and can access the user's on-line/mobile P2P application to enroll in the cash back feature. The application may provide information to facilitate the user's utilization of the application such as providing a channel to the application in the user's on-line/mobile banking application (Block 713).

The user may also be connected to a live person over a communication channel that provides voice and/or video communication with the user device. The live connection may provide additional tutorial for the user. In one embodiment the communication channel may connect the user device to the nearest financial center (Block 710). In this embodiment the resource utilization monitoring and optimization application may receive location information from the user device and may use the location information to connect the user device to the nearest financial center (Block 711).

Another example embodiment of an example predictive optimization application will be described with reference to FIG. 5. In this embodiment the system may use a predictive logic to launch the full functionality of the resource utilization monitoring and optimization application 500 (Block 701-705). For example, the financial institution may have information about the user's current automobile. The financial institution may have financed the user's current automobile purchase and have information regarding the age of the user's automobile. Alternatively, the financial institution may have financed the user's lease of an automobile and may have information as to the termination date of the lease. The financial institution may also have information on past automobile transactions for the user and may have information that the user, on average, purchases a new car every five years. The financial may also have aggregate information for all of its customer's such that the financial institution is able to determine that on average for all of its customers in a particular set of users purchase a new automobile every 7 years. A "set of users" as used herein is a group of users selected based on a common characteristic or characteristics where the characteristics are predictive of a common need for a service of product. For example, the set of users may be based on assets, loan history, balances, types of accounts, or the like. The financial institution may also have information, based on a user's transaction history, that the user's spending on automobile repair and maintenance has increased in the past year. Using this type of both personal and aggregate user data the financial institution may be able to predict that a user may be need of a service or product of the financial institution. The examples, provided above for illustrative purposes and the factors used to predict the user's needs and the types of services and products for which the predictive analysis is undertaken may vary greatly and may include any relevant factors and may apply to any service or product offered by the financial institution. In this embodiment the predictive analysis may determine that the user may in the near future be in the market for auto financing. When the predictive analysis determines that a user may need a product or service of the financial institution the full functionality of the resource utilization monitoring and optimization application 500 (Block 707) may be launched.

As previously described the timing of the resource utilization monitoring and optimization application 500 may vary. In one embodiment the launch of the resource utilization monitoring and optimization application 500 may be based on user activity. For example, the resource utilization monitoring and optimization application 500 may launch the next time the user opens the user's on-line/mobile banking application. In other embodiments, the user may be sent an electronic message immediately upon initiation of the full functionality of the resource utilization monitoring and optimization application 500. In still other embodiments, a voice connection may be established to a user device to provide a prerecorded message or to connect the user to a live person.

If the conditions are met the system initiates the full functionality of the resource utilization monitoring and optimization application 500 (Block 707). If the conditions are not met, the online/mobile banking application 490 runs without the full functionality of the resource utilization monitoring and optimization application 500 (Block 706). When the resource utilization monitoring and optimization application is launched a communication channel may be established (Block 708). The communication channel may be over the same connection as the on-line/mobile banking application or it may comprise a separate connection such as a separate e-mail, text or other electronic communication or a voice connection. In one embodiment the communication channel delivers content to the user in the form of a tutorial explaining how the preapproved financing application works and providing step-by-step instructions for obtaining preapproved financing using the preapproved financing application (Block 709). The user receives the content on the user device 120 and can access the preapproved financing application to execute a request for preapproved financing. The application may provide information to facilitate the user's utilization of the application such as providing a channel to the application in the user's on-line/mobile banking application.

The user may also be connected to a live person over a communication channel that provides voice and/or video communication with the user device. The live channel may provide additional tutorial for the user. In one embodiment the communication channel may connect the user device to the nearest financial center (Block 710). In this embodiment the resource utilization monitoring and optimization application may receive location information from the user device and may use the location information to connect the user device to the nearest financial center (Block 711).

The system of the invention may also be used to set up an appointment at a financial center 600 of the financial institution or other physical location (Block 712). In this embodiment the resource utilization monitoring and optimization application may receive location information from the user device (Block 710) and may use the location information to connect the user device to the nearest financial center. The resource utilization monitoring and optimization application may also send information related to the resource application to the financial center 600 (Block 714). In the current embodiment the user may go to the financial center to obtain a document or provide further information at the financial center 600. In one embodiment the system of the invention may provide the user with a code such as a PIN over the communication channel to facilitate the interaction at the financial center 600. In some embodiments that code may only be operable at selected locations. For example the code may only be operable at locations that are within a predetermined distance from the user's present location or from the user's home location, work location or other known location.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium. Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s).

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for monitoring resource utilization and resource optimization, the system comprising:
   one or more network communication interfaces;
   one or more memory devices storing a resource monitoring and utilization application, resource applications, and physical transactions;
   a processing device operatively coupled to the one or more memory devices, wherein the processing device is configured to execute computer-readable program code to:
   monitor utilization of the resource applications by a user on a user device, wherein the resource applications comprise an entity's on-line and mobile resource transaction applications;
   monitor the physical transactions made by the user through the use of one or more entity systems, wherein the physical transactions occur without the use of the resource applications;
   access logic rules, wherein the logic rules are used to determine optimum resource utilization for the resource applications for the user based on potential utilization of the resources applications;
   determine based on the utilization of the resource applications, the physical transactions, and the logic rules when the optimum resource utilization is met by comparing the utilization of the resource applications and the physical transactions to potential utilization of the resource applications;
   take no action when the optimum resource utilization is met;
   initiate the resource monitoring and utilization application on the user device when the optimum resource utilization fails to be met;
   establish a communication channel between the user device and the one or more entity systems in response to initiating functionality of the resource monitoring and utilization application; and
   transmit control signals to the user device to dynamically display a graphical user interface with information associated with the utilization of at least one of the resource applications from the one or more entity systems, wherein the information is transmitted from the one or more entity systems to the user device via the communication channel, and wherein the information is about the utilization of the at least one of the resource applications.

2. The system of claim 1, wherein the resource applications comprises at least an online/mobile banking application.

3. The system of claim 1, wherein the logic rules determine if a predetermined condition is met.

4. The system of claim 1, wherein the logic rules are predictive of a need for the resource application.

5. The system of claim 3, wherein the predetermined condition is based on individual user data.

6. The system of claim 3, wherein the predetermined condition is based on aggregated user data.

7. The system of claim 1, wherein the information comprises a tutorial for a first resource application, and wherein transmitting the control signals to the user device to display the graphical user interface with the tutorial for the first resource application occurs in response to the user using the first resource application or another resource application when the potential utilization of the first resource application could have been used to meet the optimum resource utilization.

8. The system of claim 1, wherein the information comprises contact information for a financial center based on a location of the user device.

9. A method for monitoring resource utilization and optimization, the method comprising:
   monitoring, by one or more processing devices, utilization of resource applications by a user on a user device, wherein the resource applications comprise an entity's on-line and mobile resource transaction applications;
   monitoring, by the one or more processing devices, physical transactions made by the user through the use of one or more entity systems, wherein the physical transactions occur without the use of the resource applications;
   accessing, by the one or more processing devices, logic rules, wherein the logic rules are used to determine optimum resource utilization for the resource applications for the user based on potential utilization of the resources applications;
   determining, by the one or more processing devices, based on the utilization of the resource applications, the physical transactions, and the logic rules when the optimum resource utilization is met by comparing the utilization of the resource applications and the physical transactions to potential utilization of the resource applications;
   take no action when the optimum resource utilization is met;
   initiating, by the one or more processing devices, the resource monitoring and utilization application on the user device when the optimum resource utilization fails to be met;
   establishing, by the one or more processing devices, a communication channel between the user device and the one or more entity systems in response to initiating functionality of the resource monitoring and utilization application; and
   transmitting, by the one or more processing devices, control signals to the user device to dynamically display a graphical user interface with information associated with the utilization of at least one of the resource applications from the one or more entity systems, wherein the information is transmitted from the one or more entity systems to the user device via the communication channel, and wherein the information is about the utilization of the at least one of the resource applications.

10. The method of claim 9, wherein the logic rules determine if a predetermined condition is met where the predetermined condition is based on individual user data or aggregated user data.

11. The method of claim 9, wherein the resource applications comprise at least an online/mobile banking application and the one or more entity systems comprise a financial institution system.

12. The method of claim 9, wherein the information comprises a tutorial for a first resource application, and wherein transmitting the control signals to the user device to display the graphical user interface with the tutorial for the first resource application occurs in response to the user using the first resource application or another resource application when the potential utilization of the first resource application could have been used to meet the optimum resource utilization.

13. The method of claim 9, wherein the information comprises contact information for a financial center based on a location of the user device.

14. A computer program product for monitoring resource utilization and optimization, the computer program product comprising at least one non-transitory computer-readable medium having computer-readable program code portions embodied therein, the computer-readable program code portions comprising:
   an executable portion configured to monitor utilization of resource applications by a user on a user device, wherein the resource applications comprise an entity's on-line and mobile resource transaction applications;
   an executable portion configured to monitor physical transactions made by the user through the use of one or more entity systems, wherein the physical transactions occur without the use of the resource applications;
   an executable portion configured to access logic rules, wherein the logic rules are used to determine optimum resource utilization for the resource applications for the user based on potential utilization of the resources applications;
   an executable portion configured to determine based on the utilization of the resource applications, the physical transactions, and the logic rules when the optimum resource utilization is met by comparing the utilization of the resource applications and the physical transactions to potential utilization of the resource applications;
   an executable portion configured to take no action when the optimum resource utilization is met;
   an executable portion configured to initiate the resource monitoring and utilization application on the user device when the optimum resource utilization fails to be met;
   an executable portion configured to establish a communication channel between the user device and the one or more entity systems in response to initiating functionality of the resource monitoring and utilization application; and
   an executable portion configured to transmit control signals to the user device to dynamically display a graphical user interface with information associated with the utilization of at least one of the resource applications from the one or more entity systems, wherein the information is transmitted from the one or more entity systems to the user device via the communication channel, and wherein the information is about the utilization of the at least one of the resource applications.

15. The computer program product of claim 14, wherein the logic rules determine if a predetermined condition is met where the predetermined condition is based on individual user data or aggregated user data.

16. The computer program product of claim 14, wherein the resource applications comprise at least an online/mobile banking application and the one or more entity systems comprise one or more financial institution systems.

17. The computer program product of claim 14, wherein the information comprises a tutorial for a first resource application, and wherein transmitting the control signals to the user device to display the graphical user interface with the tutorial for the first resource application occurs in response to the user using the first resource application or another resource application when the potential utilization of the first resource application could have been used to meet the optimum resource utilization.

18. The computer program product of claim 14, wherein the information comprises contact information for a financial center based on a location of the user device.

* * * * *